(12) United States Patent
Daenicke et al.

(10) Patent No.: US 12,516,459 B2
(45) Date of Patent: Jan. 6, 2026

(54) PROCESS FOR MANUFACTURING A POLYMER NONWOVEN, PROCESS FOR USING A SEMIFINISHED NONWOVEN PRODUCT AND PROCESS FOR USING A POLYMER NONWOVEN

(71) Applicant: Friedrich-Alexander-Universität Erlangen-Nürnberg Körperschaft des öffentlichen Rechts, Erlangen (DE)

(72) Inventors: Jonas Daenicke, Nuremberg (DE); Dirk Wolfram Schubert, Eggolsheim (DE)

(73) Assignee: Friedrich-Alexander-Universität Erlangen-Nürnberg Körpershaft des öffentlichen Rechts, Erlangen (DE)

( * ) Notice: Subject to any disclaimer, the term of this patent is extended or adjusted under 35 U.S.C. 154(b) by 0 days.

(21) Appl. No.: 18/433,728

(22) Filed: Feb. 6, 2024

(65) Prior Publication Data

US 2024/0175175 A1    May 30, 2024

Related U.S. Application Data

(63) Continuation of application No. PCT/EP2022/071755, filed on Aug. 2, 2022.

(30) Foreign Application Priority Data

Aug. 6, 2021  (DE) ...................... 10 2021 208 606.3

(51) Int. Cl.
*D01D 1/04* (2006.01)
*D01D 5/08* (2006.01)
(Continued)

(52) U.S. Cl.
CPC ........... *D04H 3/007* (2013.01); *D01D 5/0985* (2013.01); *D02J 1/229* (2013.01); *D06C 3/00* (2013.01); *D04H 3/16* (2013.01)

(58) Field of Classification Search
CPC .......... D01D 1/04; D01D 5/08; D01D 5/0985; D01D 5/12; D01F 6/46; D02J 1/22; D02J 1/229; D04H 3/16; D06C 3/00
(Continued)

(56) References Cited

U.S. PATENT DOCUMENTS 5,041,255 A * 8/1991 Zafiroglu ............... D06C 19/00
                                             264/342 RE
5,219,633 A * 6/1993 Sabee ..................... D04H 3/16
                                             428/113
(Continued)

FOREIGN PATENT DOCUMENTS

CN   112281313 A   1/2021
DE   10358409 A1   7/2005
(Continued)

*Primary Examiner* — Leo B Tentoni
(74) *Attorney, Agent, or Firm* — Laurence A. Greenberg; Werner H. Stemer; Ralph E. Locher

(57) ABSTRACT

A process for producing a polymer nonwoven fabric includes providing a polymer blend of a thermoplastic elastomer and a further thermoplastic material. Fibers are produced from the polymer blend. A nonwoven semifinished product is formed from the fibers. In order to then produce the polymer nonwoven fabric, a volume increase is produced by mechanical stretching of the nonwoven semifinished product and subsequent relaxation. A process for using a semifinished nonwoven product and a process for using a polymer nonwoven are also provided.

16 Claims, 1 Drawing Sheet

(51) Int. Cl.
*D01D 5/098* (2006.01)
*D01D 5/12* (2006.01)
*D01F 6/46* (2006.01)
*D02J 1/22* (2006.01)
*D04H 3/007* (2012.01)
*D06C 3/00* (2006.01)
*D04H 3/16* (2006.01)

(58) Field of Classification Search
USPC .......... 264/103, 210.1, 210.8, 290.5, 331.13, 264/331.17, 342 RE, 555
See application file for complete search history.

(56) References Cited

U.S. PATENT DOCUMENTS

| | | | |
|---|---|---|---|
| 7,462,573 B2 * | 12/2008 | Tsujiyama | ............... D04H 3/16 442/364 |
| 7,501,361 B2 | 3/2009 | Baldauf | |
| 2014/0081414 A1 * | 3/2014 | Hall | ........................ A61L 31/10 264/413 |
| 2019/0183690 A1 | 6/2019 | Nhan et al. | |
| 2019/0388263 A1 | 12/2019 | Emslander et al. | |

FOREIGN PATENT DOCUMENTS

| | | |
|---|---|---|
| EP | 2292822 A1 | 3/2011 |
| EP | 2463428 A1 | 6/2012 |
| WO | 2017095399 A1 | 6/2017 |
| WO | 2019092166 A1 | 5/2019 |

* cited by examiner

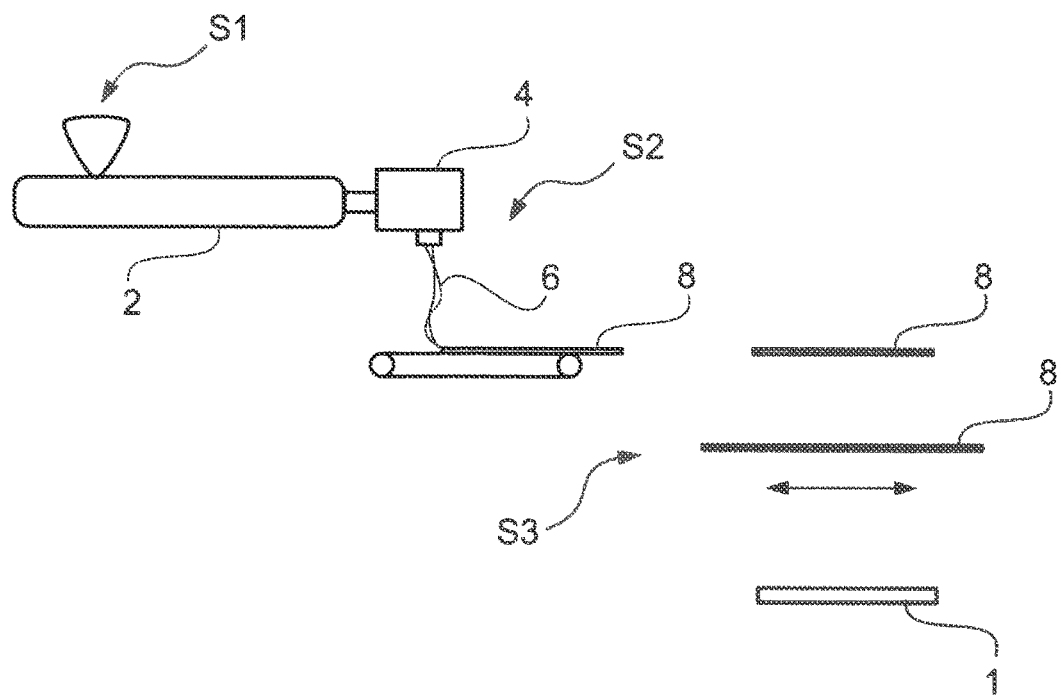
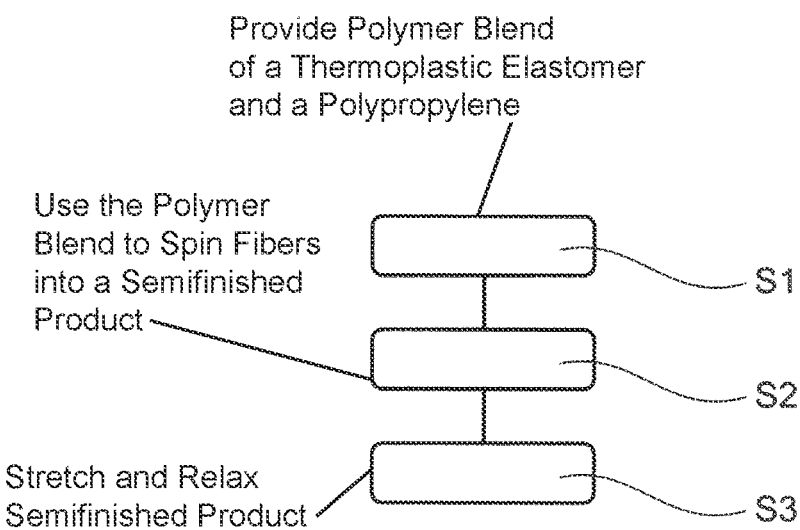
Fig. 1
Fig. 2

PROCESS FOR MANUFACTURING A POLYMER NONWOVEN, PROCESS FOR USING A SEMIFINISHED NONWOVEN PRODUCT AND PROCESS FOR USING A POLYMER NONWOVEN

CROSS-REFERENCE TO RELATED APPLICATION

This application is a continuation, under 35 U.S.C. § 120, of copending International Patent Application PCT/EP2022/071755, filed Aug. 2, 2022, which designated the United States; this application also claims the priority, under 35 U.S.C. § 119, of German Patent Application DE 10 2021 208 606.3, filed, Aug. 6, 2021; the prior applications are herewith incorporated by reference in their entirety.

FIELD AND BACKGROUND OF THE INVENTION

The invention relates to a process for producing a polymer nonwoven. The invention further relates to use of a semifinished nonwoven product on which the polymer nonwoven is based, and to a use of the polymer nonwoven.

Polymer nonwovens are nowadays used in many different applications. They are frequently called nonwovens to distinguish them in terms of structure from other "textiles," especially weaves and knits. In principle, such polymer nonwovens may be used in the context of fiber reinforcements, for example as a superficial laminate layer, in order to form a very smooth surface with few signs of fiber undulations, or as an approximately isotropic reinforcement layer. They are also used as filter material, for example in respiratory masks, but also, for example, in vacuum cleaner bags or exchangeable filters.

Also of interest, however, are applications with the purpose of absorbing and/or transferring liquid. They are used there, for example, in the field of (baby) diapers or the like, as what is called an acquisition/distribution layer ("ADL"). The function thereof is to absorb liquid due to good absorptivity and to distribute it two-dimensionally over a storage medium beneath, usually a gel.

For the latter purpose in particular, comparatively voluminous nonwoven structures are the aim. The prior art, for example U.S. Publication No. 2019/0388263 A1 or U.S. Publication No. 2019/0183690 A1, disclose layer structures in which such a polymer nonwoven is stuck onto an elastic carrier material at multiple sites while it is in a stretched state. On subsequent relaxation, the carrier material contracts, which causes the polymer nonwoven to "fluff up" as a result of formation of corrugations or folds.

Moreover, ADLs are frequently also produced from carded fibers, which is comparatively complex.

SUMMARY OF THE INVENTION

It is accordingly an object of the invention to provide a process for manufacturing a polymer nonwoven, a process for using a semifinished nonwoven product and a process for using a polymer nonwoven, which overcome the hereinafore-mentioned disadvantages of the heretofore-known processes of this general type and which improve the production of a polymer nonwoven.

With the foregoing and other objects in view there is provided, in accordance with the invention, a process for producing a polymer nonwoven, in which process a polymer blend of a thermoplastic polymer and a further thermoplastic material is provided, the polymer blend is used to produce fibers and these are used to form a semifinished nonwoven product, and the polymer nonwoven is produced by mechanical stretching of the semifinished nonwoven product and subsequent relaxation in order to achieve an increase in volume.

With the objects of the invention in view, there is also provided a process for using a semifinished nonwoven product formed from fibers produced from a polymer blend which is formed from a thermoplastic elastomer and a further thermoplastic material in order to produce a polymer nonwoven, especially an acquisition/distribution layer formed therefrom, wherein mechanical stretching of the semifinished nonwoven product and subsequent relaxation cause an increase in volume of the semifinished nonwoven product and produce the polymer nonwoven.

With the objects of the invention in view, there is concomitantly provided a process for using a polymer nonwoven produced according to the invention as a support for catalyst particles, activated carbon particles and/or superabsorbent particles.

Further advantageous embodiments and developments of the invention that are inventive per se are set out in the dependent claims and in the description that follows.

The process of the invention serves for production of a polymer nonwoven. The process involves first providing a polymer blend of a thermoplastic elastomer (referred to hereinafter as "TPE") and a further thermoplastic material. This polymer blend is used to produce ("spin") fibers, and these, especially at the same time, are used to form a semifinished nonwoven product. The polymer nonwoven is produced by subsequently mechanically stretching of the semifinished nonwoven product. Subsequent relaxation (i.e. removal of the mechanical stretching) creates (causes) an increase in volume.

In other words, the polymer nonwoven is produced by stretching and then relaxing a nonwoven or semifinished nonwoven product (especially a conventional spunbond nonwoven or spunbond semifinished nonwoven product) that has been formed from the polymer blend. This stretching and subsequent relaxation causes the nonwoven to undergo the aforementioned increase in volume. The effect of the increase in volume is based herein in particular on plastic and hence irreversible stretching of the components of the further thermoplastic material within the fibers formed by the polymer blend, while the TPE components are elastically resilient. This results in bending of the plastically deformed components and hence of the whole fiber, which leads to an increase in volume in the nonwoven.

Preference is given herein to using just one type of fiber, namely that formed from the polymer blend. The semifinished nonwoven product is thus not a laminate, a multifiber nonwoven or the like. Particular preference is given to this type of fiber, meaning that the fibers for the semifinished nonwoven product are formed solely from the polymer blend.

This course of action has the advantage that the semifinished nonwoven product has a conventional thickness for (spunbond) nonwovens—especially directly after the manufacture of the nonwoven—and hence particularly good storage and transport properties. By comparison with conventional voluminous polymer nonwovens that already reach their target volume—especially their target thickness—in the course of manufacture thereof, it is possible in this case in a simple and advantageous manner to move the formation of the target volume to the site of further processing, since all that is required is stretching of the semifinished nonwoven product, by comparison with comparatively complex lamination processes.

In a preferred process variant, the TPE employed is a thermoplastic polyurethane (referred to hereinafter as "TPU").

In an appropriate process variant, the further thermoplastic material employed is one having a difference in solubility parameter with respect to the components of the TPE (usually in the form of a (block) copolymer) of greater than 1, preferably of greater than $$2\left(\frac{J}{cm^3}\right)^{1/2}.$$

In a further appropriate process variant, the further thermoplastic material employed is a thermoplastic which is incompatible with the TPE, especially TPU. What is meant by "incompatible" in this case and hereinafter, in particular, is that the further thermoplastic material, rather than forming a common phase with the TPE, especially TPU, in the polymer blend, is present as a separate phase alongside the TPE, especially TPU, phase. This is achieved or enabled especially because of the above-described difference in solubility parameter. In particular, a polypropylene (PP) or a polyethylene (PE) is employed.

Preference is also given herein to employing a material which is stiffer, especially comparatively inelastic, compared to the TPE, especially TPU (i.e., in particular, a conventional thermoplastic—effectively a "non-TPE thermoplastic").

In an appropriate process variant, the further thermoplastic material is added to the TPE/TPU with a proportion of 1.5% to 30% by weight, especially of 5% 20% by weight.

Moreover, the fibers formed from the polymer blend, in a further appropriate process variant, are stretched in the production thereof, at least in the formation of the semifinished nonwoven product, especially way in such a that fibrils of the deposited phases of the further thermoplastic material are formed in the spinning process. Expressed in visual terms, the deposited phases of the further thermoplastic material form "ultrasmall fibers" within the fibers formed from the polymer blend, i.e. a kind of "sub-fibers" embedded in the TPE.

In particular, the fibers are produced by what is called a meltblown process, and this also forms the semifinished nonwoven product when the fibers produced are laid down. The TPU has the particular advantage in this case that the fibers are self-binding when they are laid down, and hence the integrity of the semifinished nonwoven product can be enabled. This is especially because the fibers in the meltblown process are still tacky because of the supply of hot gas in the laydown operation. As a result, there is advantageously no need for typical post-consolidation methods such as air through drying, calendering, needlepunching, etc.

Alternatively, formation of the fibers and of the semifinished nonwoven product by other spinning methods, especially by melt spinning, is likewise possible. Here too, the fibers are stretched in the production thereof, i.e. in the course of the spinning process. In that case, in particular, there is conventional post-consolidation of the fibers laid down (especially randomly one on top of another) to give the semifinished nonwoven product. This post-consolidation— for example local (spot) calendering, air through drying or needlepunching—precedes the subsequent (or later) stretching of the semifinished nonwoven product, which serves to increase the volume.

In a further appropriate process variant, the mechanical stretching of the semifinished nonwoven product also increases a pore size. In other words, the size of the pores of the semifinished nonwoven product (especially likewise or in addition to the volume) is increased. This is in turn advantageous for the use of the polymer nonwoven as ADL.

In a particularly appropriate process variant, the thickness of the semifinished nonwoven product is increased due to the mechanical stretching and hence also the increase in volume by 2 to 10 times, especially up to 8 times, especially by comparison with the original thickness of the semifinished nonwoven product. This can, for example, reduce the space required for storage and/or transport, or, conversely, allow a greater amount of semifinished product to be stored or transported.

In the mechanical stretching operation, in an appropriate process variant, especially for establishment of the above-described changes in volume and properties of the semifinished nonwoven product, the semifinished nonwoven product is stretched by at least 20, 25 or 50 percent and up to 80 percent, especially to 75 percent (especially by comparison with its original length).

The further thermoplastic material is preferably chosen such that it remains plastically deformed with these degrees of deformation (i.e. the aforementioned percentage stretches), whereas the TPE is elastically resilient.

Experiments have been conducted, inter alia, with a TPU of the Elastollan brand (registered trademark of BASF Polyurethanes GmbH), type 1180A, and, as a further (thermoplastic) material, a polypropylene (PP) of type HL504FB (Borealis AG) with a proportion of 5% by weight or a PP of the Moplen brand (registered trademark of LyondellBasell Industries Holdings B.V.), type HP561r with a proportion of 20% by weight. After the mechanical stretching—in this case with stretching of about 25 and 38 percent—about five times or even about eight times the nonwoven thickness has been found.

For example, in the case of an original thickness of the semifinished nonwoven product of 0.85 millimeter after the stretching, a thickness of about 6.58 millimeters was found for the polymer nonwoven.

The invention also envisages the use of the above-described semifinished nonwoven product for production of a polymer nonwoven, especially for use as ADL. Therefore, the semifinished nonwoven product as described above is formed from fibers that have been produced from the polymer blend formed from TPE, especially TPU, and a further thermoplastic material. According to the invention, the semifinished nonwoven product is mechanically stretched and then relaxed, which causes the increase in volume of the semifinished nonwoven product and produces the polymer nonwoven which is then preferably used as ADL.

The invention also envisages—additionally or alternatively to the use of the polymer nonwoven as ADL—the use of the polymer nonwoven produced by the process described above as a support for catalyst particles, activated carbon particles, superabsorbent particles and/or the like.

The uses of the invention and the above-described process of the invention share all of the process steps described above and hence also the physical features and advantages that arise therefrom.

The conjunction "and/or" in this case and hereinafter should especially be understood such that the features linked by that conjugation may be embodied either collectively or as alternatives to one another.

Other features which are considered as characteristic for the invention are set forth in the appended claims.

Although the invention is illustrated and described herein as embodied in a process for manufacturing a polymer nonwoven, a process for using a semifinished nonwoven product and a process for using a polymer nonwoven, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 is a schematic diagram of individual process steps of the process; and

FIG. 2 is a schematic flow diagram of a process for producing a polymer nonwoven.

DETAILED DESCRIPTION OF THE INVENTION

Referring now in detail to FIGS. 1 and 2 of the drawings, in which mutually corresponding parts are always given the same reference numerals, there is seen a process for producing a polymer nonwoven, a nonwoven 1 for short, which is described hereinafter. For this purpose, in a first process step S1, a polymer blend of a thermoplastic elastomer, specifically a thermoplastic polyurethane (TPU) and a polypropylene (PP), is provided. In the present working example, PP is added to the TPU with a proportion by weight of 5%. Through the use of an extruder 2, the polymer blend is supplied to a spinning apparatus 4. The blending (i.e. the creation of the polymer blend) is optionally also only effected once the material is within this extruder 2.

Through the use of the spinning apparatus 4, the polymer blend, in a second process step S2, is used to spin fibers 6 by using the spinning apparatus 4, specifically by a meltblown process. The laydown of the fibers 6 directly produces a semifinished nonwoven product (referred to here as a "semifinished product 8" for short). Specifically, the semifinished product 8 is already a nonwoven in the actual sense, i.e. randomly laid and mutually bonded fibers 6. The integrity of the fibers 6 in the semifinished product 8, because of the meltblown process, is enabled by the still "hot" fibers 6 and the TPU components that are thus still tacky.

The final semifinished product 8 can then be stored (intermediately) or transported to a site for further processing.

In a third process step S3, which can and preferably should be effected at the site of further processing, the semifinished product 8 is mechanically stretched. The semifinished product 8 is stretched in this case by about 40%. After the stretching, the semifinished product 8 is relaxed again. On relaxation, an increase in volume of the semifinished product 8 is established, which is reflected in a multiplication of the thickness, for example in a 5-fold increase. The semifinished product 8 thus treated forms the target product, the nonwoven 1. This can be used, for example, as what is called an acquisition/distribution layer, for example in diapers or the like. In addition, the nonwoven 1 may alternatively be used as a support for catalyst particles, activated carbon particles and/or superabsorbent particles.

The subject matter of the invention is not limited to the working example described above. Instead, further embodiments of the invention can be inferred by the person skilled in the art from the description above.

The following is a summary list of reference numerals and the corresponding structure used in the above description of the invention.

LIST OF REFERENCE NUMERALS 1 nonwoven
2 extruder
4 spinning apparatus
6 fiber
8 semifinished product
S1 process step
S2 process step
S3 process step

The invention claimed is:

1. A process for producing a polymer nonwoven, the process comprising:
providing a polymer blend of a thermoplastic elastomer and a further thermoplastic material;
using only the polymer blend to produce one type of fibers and using the fibers to form a semifinished nonwoven product; and
producing the polymer nonwoven by mechanical stretching and subsequent relaxation of the semifinished nonwoven product to achieve an increase in volume.

2. The process according to claim 1, which further comprises providing a thermoplastic polyurethane as the thermoplastic elastomer.

3. The process according to claim 1, which further comprises providing the further thermoplastic material as a material having a difference in solubility parameter with respect to components of the thermoplastic elastomer of greater than 1.

4. The process according to claim 1, which further comprises providing the further thermoplastic material as a material having a difference in solubility parameter with respect to components of the thermoplastic elastomer of greater than $2(j/(cm^3))^{(1/2)}$.

5. The process according to claim 1, which further comprises providing the further thermoplastic material as a thermoplastic being incompatible with the thermoplastic elastomer.

6. The process according to claim 1, which further comprises providing the further thermoplastic material as a polypropylene or a polyethylene being incompatible with the thermoplastic elastomer.

7. The process according to claim 1, which further comprises adding the further thermoplastic material to the thermoplastic elastomer with a proportion of 1.5% to 30% by weight.

8. The process according to claim 1, which further comprises adding the further thermoplastic material to the thermoplastic elastomer with a proportion of 5% to 20% by weight.

9. The process according to claim 1, which further comprises stretching the fibers in the forming of the semifinished nonwoven product.

10. The process according to claim 1, which further comprises producing the semifinished nonwoven product in a meltblown process.

11. The process according to claim 1, which further comprises using the mechanical stretching to increase a pore size.

12. The process according to claim 1, which further comprises using the mechanical stretching to increase a thickness of the semifinished nonwoven product by 2 to 10 times.

13. The process according to claim 1, which further comprises using the mechanical stretching to increase a thickness of the semifinished nonwoven product by up to 8 times.

14. The process according to claim 1, which further comprises stretching the semifinished nonwoven product by 20 to 80 percent.

15. The process according to claim 1, which further comprises stretching the semifinished nonwoven product by 25 to 75 percent.

16. A process for using a semifinished nonwoven product formed from one type of fibers produced only from a polymer blend formed from a thermoplastic elastomer and a further thermoplastic material to produce a polymer nonwoven or an acquisition/distribution layer formed from the polymer nonwoven, the process comprising:

mechanically stretching and subsequently relaxing the semifinished nonwoven product causing an increase in volume of the semifinished nonwoven product and producing the polymer nonwoven.

* * * * *